May 8, 1923.
F. T. BAIRD
1,454,033
CHARGING RACK
Filed Oct. 24, 1921 2 Sheets-Sheet 2
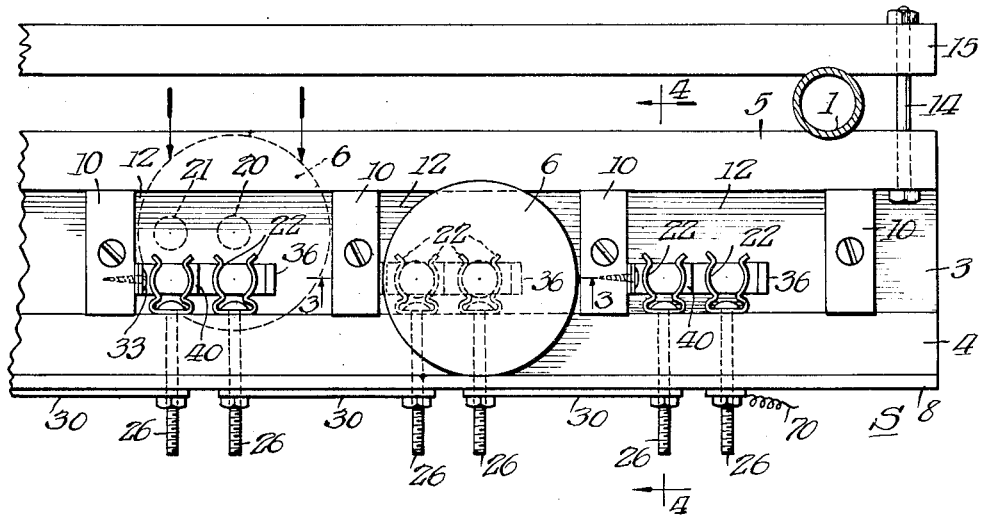
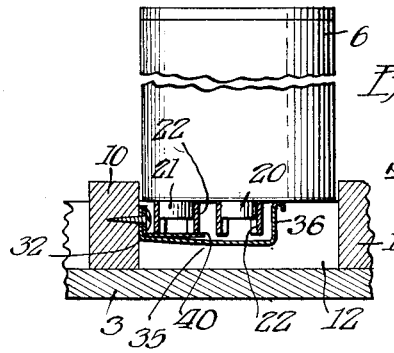
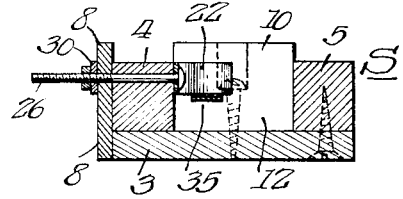
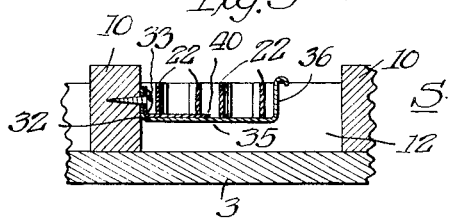
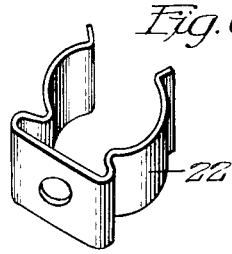
Inventor
Frank T. Baird,
By Cheever & Cox
Attys.

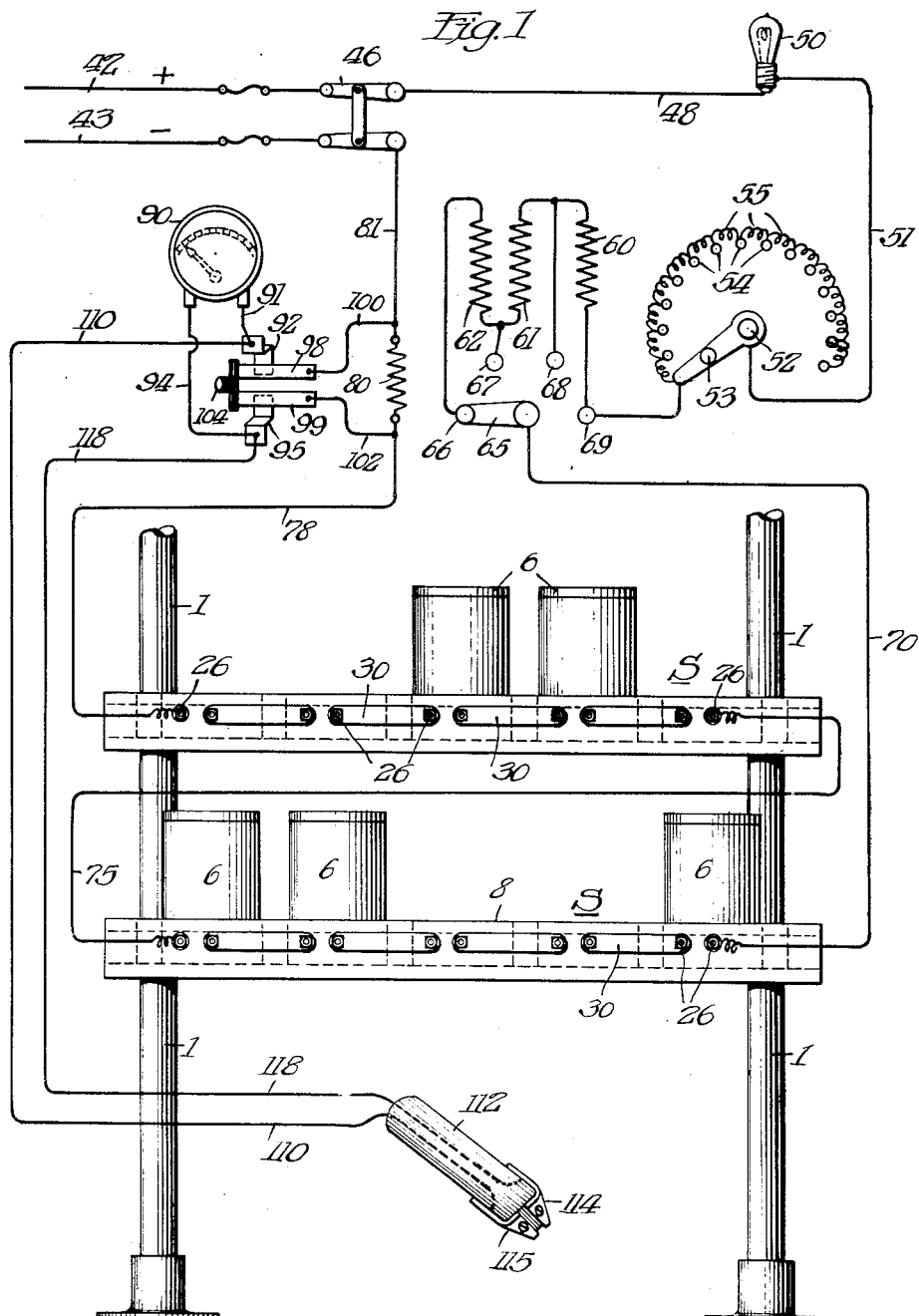

Patented May 8, 1923.

1,454,033

UNITED STATES PATENT OFFICE.

FRANK T. BAIRD, OF BLUE ISLAND, ILLINOIS.

CHARGING RACK.

Application filed October 24, 1921. Serial No. 509,880.

*To all whom it may concern:*

Be it known that I, FRANK T. BAIRD, a citizen of the United States, residing at Blue Island, in the county of Cook and State of Illinois, have invented a certain new and useful Improvement in Charging Racks, of which the following is a specification.

My invention relates to racks for charging electric cells or batteries, and the general object of the invention is to provide charging apparatus which is simple and inexpensive to make, can be readily kept in order, can be used by unskilled persons, and can accommodate a varying number of batteries within the capacity of the apparatus. One of the specific objects of the invention is to provide a construction which will make it impossible for the battery to be inserted wrongly. One terminal of a battery is, of course, the positive terminal, and the other the negative, and these must be properly inserted in the charging circuit to prevent loss of energy and damage to the battery. My purpose is to provide a construction which will prevent the operator from inserting the battery in any position but the correct one. Another object of the invention is to provide a construction by which the "station switches" will be automatically opened by the batteries prior to the engagement of the battery terminals with the station terminals. Another object is to provide means whereby the station switches may be operated by the battery casing in distinction to the battery terminals. It is common, if not universal practice to make battery casings of insulating material, and hence in my rack the station switches are opened not by conductors, but by non-conductors. By station switches I mean the switches provided at each pocket or station designed for the reception of the individual batteries.

I accomplish my objects by the mechanism illustrated in the accompanying drawings, in which—

Figure 1 is a general assembly view of the complete apparatus shown partially in a physical and partially in a diagrammatic form.

Figure 2 is a plan section of the apparatus taken on a horizontal plane located between the two shelves of Figure 1.

Figure 3 is a vertical section on the line 3—3, Figure 2.

Figure 4 is a vertical section on the line 4—4, Figure 2.

Figure 5 is similar to Figure 3, but shows the station switch closed.

Figure 6 is a perspective view of the clip which forms one of the charging terminals.

Like numerals denote like parts throughout the several views.

In the form selected to illustrate the invention the rack includes a pair of uprights or standards 1 having a series of shelves or platforms, indicated in general by S. These shelves may be made in various forms, but in the design illustrated are composed of bottom boards 3 having upstanding marginal strips 4 and 5 at the front and back respectively. These form supports for the batteries 6. A facing strip 8 is secured to the front of the strip 4 and rises somewhat above it to form a retainer holding the batteries in place. Spaced at stated intervals slightly in excess of the diameter of a battery are blocks 10 which form partitions between the different charging stations 12. The shelves S which are those composed of the elements 3, 4, 5, 8 and 10, are secured to the uprights 1 in any suitable manner. In the present case they are shown as being clamped to the uprights by means of bolts 14 and a clamping bar 15, shown in Figure 2.

Now referring to the electric terminals and connectors on the shelves:

It will be understood that the batteries are provided with two terminals on the bottom, one terminal 20 being located at the center and the other 21, being located off center or near one side. These battery terminals are round and are adapted to fit into clips 22 shown in perspective in Figure 6. There is a pair of clips for each charging station 12, one of these clips being located at the center of the station and the other near one side thereof, as shown in plan in Figure 2. These clips are held in position by studs 26 which pass through the clips and through the front strip 4 and face strip 8. The center clip of each station is connected to the side clip of the adjacent station by a connector bar 30. Thus the positive clip of one charging station is duly connected, electrically, with the negative clip of the adjacent station, thus affording a series connection for the clips for charging the batteries.

When the batteries are present with the terminals 20, 21 engaged in the clips 22, a charging circuit will be completed through the batteries. I have provided automatic switches for completing the charging circuit when the batteries are present. These switches consist of spring brass or other suitable conductive material, one end of which, 32, is bent so as to lie in contact with a partition block 10. This end of the switch is rigidly fastened by means of a wood screw 33 or other suitable fastener. The body portion 35 of the switch lies horizontally and is adapted to engage the bottom of the center clip 22. The free end 36 of the switch is bent upward so that under normal conditions it rises appreciably above the top of the center clip. The result is that when the battery is lowered into position at a charging station the bottom of the battery will engage the upstanding portion 36 and move the switch out of contact with the center clip, thus breaking the circuit through the switch and causing the current to pass through the battery. In order to improve the contact of the switch with the clips 22 it is desirable to provide an angle lug 40, best shown in Figures 3 and 5. This lug makes permanent engagement with the bottom of the outer clip and is secured by the fastening device 33 to the portion 32 of the switch. Thus the switch is at all times in contact with the lug, which is at all times in contact with one of the clips and normally tends to engage the center clip, but leaves it if pressed down by the battery when the latter is inserted into the rack.

To now describe the charging circuit: Current is supplied from the supply conductors 42, 43, shown in Figure 1. The current from the supply conductors is controlled by a surface switch 46 in the ordinary manner. For the sake of description let it be assumed that the conductor 42 is positive and that in practice the current flows from it through the surface switch to the conductor 48. From said conductor the current flows through a pilot lamp 50, thence through a conductor 51 to the center contact 52 of a rheostat. Said rheostat has a controller handle 53 which engages with the various contacts 54 which are connected through resistances 55 in the well known manner. This first rheostat is intended for making the finer adjustments. For making the coarser adjustments it is desirable to provide a second rheostat or bank of resistances 60, 61, 62. These are controlled by a handle 65 which is adapted to engage the contacts 66, 67, 68, 69. By suitably adjusting the controller handles 53 and 65 a proper strength of charging current may be obtained for any number of batteries within the capacity of the apparatus. Leading from the controller handle 65 is a conductor 70 which makes electric contact with the stud 26 at one end of the lower shelf. This energizes the center clip of the associated station and, assuming that a battery is in position, the current will flow thru the battery and out thru the adjacent stud 26. From here the current flows thru the adjacent connector 30 and thus if all of the batteries are in place the current will finally come out thru the conductor 75 at the opposite end of the shelf. This conductor leads to a stud 26 at one end of the next shelf above, and the current will traverse the parts as before until it arrives at the stud 26 at the opposite end of the same shelf. A conductor 76 then leads the current to a low-value resistance 80 the opposite end whereof is connected by a conductor 81 to the service switch 46. It will thus be seen that if the batteries are in place the current will pass in series thru the first and second rheostat, thence thru the conductive elements of the apparatus and such batteries as are in place and thence out to the negative side 43 of the line. If a battery is absent from any station the spring switch 35, 36 is, of course, closed, and will connect the center clip of that station to the side clip thereof, thus avoiding breaking of the circuit.

In introducing the battery into the rack the operator will proceed as follows: He first lowers the battery into the station from behind, letting it rest upon the two ledges 4, 5 in the position indicated in dotted lines in Figure 2. This lowering of the battery causes the bottom of it to engage the upstanding portion 36 of the spring switch and move the switch to open position, as shown in Figure 3. The normal or closed position is shown in Figure 5. This temporarily breaks the circuit, but the circuit is immediately reestablished by the operator by sliding the battery towards him, that is, in the directions shown in the two parallel arrows to the left end of Figure 2. This movement causes the two battery terminals to engage the proper spring clips 22 and put the battery in circuit through them. It will be noted that this is a simple manipulation, and yet the battery cannot be inserted improperly for the blocks 10 serve to guide the battery. Furthermore, the terminals cannot be inserted incorrectly as to polarity for there is no possible way for the operator to insert the center terminal of the battery into the side clip of the charging station. The terminals and clips may be said to be placed "asymmetrically," and hence a reversal of polarity is impossible. The blocks 10 form side guides, and the face strip 8 forms a front stop, and if a battery is brought to the position shown in full lines in Figure 2, the operator may be certain that the terminals are properly connected. These side blocks and facing strip may be regarded as forming stalls or pockets for the batteries and these stalls may be considered to have depressed centers for accommodating the terminals of the battery.

I will now describe means whereby the strength of the charging current may be tested: A volt meter 90 is connected by a conductor 91 to a stationary terminal 92. The opposite side of the volt meter is connected by a conductor 94 to a stationary terminal 95. A spring switch element 98 overlies terminal 92 while a similar spring switch element 99 overlies the terminal 95. Element 98 is connected by a conductor 100 to conductor 81, while element 99 is connected by a conductor 102 to conductor 78. The spring elements 98, 99 are mechanically connected together and are controlled by an insulating handle 104. Elements 98 and 99 are normally open, that is, out of contact with their terminals 92, 95. However, it will be evident that when said switch elements are depressed a portion of the charging current will be shunted around the low resistance 80 and thru the volt meter. The value of the resistance of the volt meter bears a definite and known ratio to the value of the resistance 80 and hence by reading the volt meter at any time the strength of the charging current may be readily computed in accordance with well known principles.

In operating the rack the procedure is first to put in the number of cells desired, then adjust the rheostats until the volt meter shows the proper strength of charging current. The switch elements 98, 99 are held depressed for the purpose and ordinarily the proper strength of charging current is one ampere. Consequently after the desired number of batteries are in place the operator depresses the elements 98, 99 of the testing switch and then adjusts the rheostats until it is found that the charging current equals one ampere.

Now to describe the means for testing the individual cells as to how fully they are charged: Leading from the stationary terminals 92 is a conductor 110. This leads through the handle 112 of a testing plug through a conductive terminal 115. A companion terminal 114 is connected by a conductor 118 to the stationary contact 95. Handle 112 is of wood or other insulating material, and conductor 118 passes through it to reach the terminal 114. The design of this testing plug is non-essential except that the terminals 114, 115 are insulated from each other and are adapted to be inserted between any pair of studs 26 to make electric contact therewith. It will be evident that if a plug is inserted between the two studs 26 of any given charging station the terminals 114, 115 will cause the voltmeter to indicate the drop in voltage between said studs. To illustrate, the current will flow from the terminal 114 thru the conductors 118 and 94 to the voltmeter, thence through the conductors 91 and 110 to the terminal 115. It has been found by test that if a cell or battery is on charge with a charging current of one ampere the drop across the terminals will be 2½ volts if the cell is fully charged. Therefore, if it is found on plugging in the voltmeter that the drop is less than this, it shows that the battery is not completely charged and should be permitted to remain for a longer period. Thus it will be seen that any battery may be instantly tested without shutting off the charging current by merely inserting the testing plug between the associated studs 26.

From the foregoing it will be evident that the apparatus is extremely simple in construction and may accommodate few or many batteries. Furthermore, this rack does not call for a resistance in each station corresponding to the resistance of a battery to compensate for the absence of the latter. The current must be adjusted by hand, but it can be done by the use of but one or two main rheostats, as shown at the upper right corner of Figure 1.

Another advantage of the apparatus is that it is a simple matter to determine the strength of the charging current at any time. It is also a simple matter to determine the condition of charge or discharge of any individual battery, for it is not necessary to open the charging circuit before the test can be made. The only thing necessary is to insert the test plug between the proper studs and then read the voltmeter.

Another advantage of this rack is that as the clips 22 are merely bolted into place, and the switches 35 are merely screwed into place, they may be readily removed and renewed. It sometimes happens that the acid electrolyte of the batteries is spilled upon these metallic parts, causing them to become corroded. If this happens in my rack, new parts may be substituted at slight expense and trouble.

The present rack is designed to charge batteries whose terminals are located on the bottom instead of on the top. So far as the underlying principle of the invention is concerned it is immaterial whether the batteries are charged terminals up or terminals down. Consequently it will be understood in construing the appended claims that the terms "up" and "down" are to be taken relatively and not absolutely.

Having thus described my invention, what I claim as new and desire to secure by Letters Patent is:

1. A rack for charging batteries of the type wherein the battery terminals are both located at the same end of the battery casing, one at the center and one eccentrically, the rack having stalls for holding the batteries centered, charging terminals arranged in series, two terminals in each stall, one of the charging terminals being centered in the stall and the other arranged eccentrically, the terminals consisting of clips arranged horizontally and adapted to receive the battery terminals when the battery is moved horizontally towards the clips, and self closing switches for electrically connecting the terminals, the switches having upstanding projections adapted to be engaged by the bottom of the battery casing to be opened thereby when the battery is lowered into a position to bring the plane of the battery terminals into the plane of the charging terminals.

2. In a charging rack, a shelf for receiving a plurality of battery cells, transverse elements for locating the respective cells, a face plate secured to the edge of said shelf, a pair of contact clips for each cell location, and posts passing through said face plate for securing said clips in position, the projecting ends of said posts affording unobstructed facilities for circuiting different pairs of clips and testing the electrical condition between the clips of the same pair.

3. In a charging rack a shelf, parallel spaced rails arranged longitudinally thereof for supporting battery cells, contact clips for engaging the terminals of battery cells, and studs disposed transversely of one of said rails for securing said clips in position and extended exteriorly of the rail to afford unobstructed facilities for circuiting different pairs of clips and testing the electrical condition between the clips of the same pair.

4. In a charging rack a shelf, parallel spaced rails arranged longitudinally thereof for supporting battery cells, contact clips for engaging the terminals of battery cells, and studs disposed transversely of one of said rails for securing said clips in position and extended exteriorly of the rail to afford unobstructed facilities for circuiting the respective clips.

5. In a charging rack, a shelf for receiving a plurality of battery cells, a plurality of pairs of contact clips disposed in horizontal arrangement, and devices for mounting said clips upon said shelf portions of said devices being extended to afford unobstructed facilities for circuiting different pairs of clips and testing the electrical condition between the clips of the same pair.

6. In a charging rack, a shelf for receiving a plurality of battery cells, a plurality of pairs of contact clips disposed in horizontal arrangement, and studs for securing said clips in position on said shelf, the shanks of said studs being extended to afford unobstructed facilities for circuiting different pairs of clips and testing the electrical condition between the clips of the same pair.

In witness whereof, I have hereunto subscribed my name.

FRANK T. BAIRD.